United States Patent
Jenkins et al.

(10) Patent No.: US 7,113,488 B2
(45) Date of Patent: Sep. 26, 2006

(54) RECONFIGURABLE CIRCULAR BUS

(75) Inventors: Peter J. Jenkins, Colchester, VT (US); Francis A. Kampf, Jeffersonville, VT (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 10/063,456

(22) Filed: Apr. 24, 2002

(65) Prior Publication Data

US 2003/0202530 A1     Oct. 30, 2003

(51) Int. Cl.
  *H04L 12/28*     (2006.01)
(52) U.S. Cl. .......................................... 370/258
(58) Field of Classification Search ................. 710/113; 370/447, 461, 462, 222, 223, 258
  See application file for complete search history.

(56) References Cited

U.S. PATENT DOCUMENTS

| | | | |
|---|---|---|---|
| 4,821,174 A * | 4/1989 | Webb et al. ................. | 710/107 |
| 5,555,540 A | 9/1996 | Radke | |
| 5,613,077 A | 3/1997 | Leung et al. | |
| 5,689,661 A | 11/1997 | Hayashi et al. | |
| 5,729,756 A | 3/1998 | Hayashi | |
| 5,878,265 A | 3/1999 | Hartmann | |
| 5,936,953 A * | 8/1999 | Simmons ..................... | 370/364 |
| 5,974,487 A | 10/1999 | Hartmann | |
| 6,111,859 A | 8/2000 | Godfrey et al. | |
| 6,724,772 B1 * | 4/2004 | Borland et al. .............. | 370/442 |

OTHER PUBLICATIONS

Stallings, William. Local and Metropolitan Area Networks. Macmillan Publishing Company. Copyright 1993. pp. 73-77.*

* cited by examiner

*Primary Examiner*—Derrick Ferris
(74) *Attorney, Agent, or Firm*—Wood, Phillips, Katz, Clark & Mortimer

(57) ABSTRACT

A system provides communication between a plurality of cores in an integrated circuit. The system comprises a circular segmented bus operatively connected to each of the cores for transferring data between the plurality of cores. An arbiter arbitrates which of the plurality of cores can transmit data at any given time.

22 Claims, 5 Drawing Sheets

RECONFIGURABLE CIRCULAR BUS

BACKGROUND OF THE INVENTION

1. Field of the Invention

This invention relates to a system for providing communications between cores in an integrated circuit and, more particularly, to a reconfigurable circular bus.

2. Background of the Invention

A typical processing device includes various circuits such as a processor circuit, memory circuits, peripheral circuits, and the like. With recent technology, such a device may be manufactured using a printed circuit board supporting a plurality of integrated circuit chips. Each integrated circuit chip provided the functionality of one or more of the circuits. The individual circuits can be thought of as "core" circuits, or cores. When connected on a printed circuit board, the core circuits are often connected with point to point wiring.

More recently, system-on-a-chip (SOC) technology has been utilized. This technology is used, for example, in large ASICs (application specific integrated circuits) with many cores. The interconnection between cores becomes difficult due to wiring constraints and wiring congestion. A typical bus structure helps alleviate this problem by minimizing the wires between the various cores. Referring to FIG. 1, a block diagram for a typical SOC integrated circuit 10 is illustrated. The illustrative integrated circuit 10 includes six cores 12, 13, 14, 15, 16 and 17. Particularly, the cores 12, 13, 14, 15, 16 and 17 are identified under the letters A, B, C, D, E and F, respectively. Each of the cores 12–17 is connected to a data bus 18 and an address bus 20. This prior art structure limits the amount of bandwidth available for communication between the cores 12–17. All cores 12–17 share the same wires. As a result, only one pair of cores can communicate at the same time. The core connections may be tri-statable, or formed by ORing the gated outputs of all cores into one source driven back to all of the cores. Control of the buses 18 and 20 is granted by an arbiter (not shown) which grants control of the bus to one core at a time.

The present invention is directed to improvements in communication between cores in an integrated circuit.

BRIEF SUMMARY OF THE INVENTION

In accordance with the invention, there is disclosed a system for providing communication between a plurality of cores in an integrated circuit. The system comprises a circular segmented bus operatively connected to each of the cores for transferring data between the plurality of cores. Arbiter means arbitrate which of the plurality of cores can transmit data at any given time.

The circular segmented bus may comprise a data bus, an address bus, both a data bus and an address bus, or another type of bus.

Additionally, the bus may comprise a split transaction data bus and address bus.

The circular segmented bus may comprise a circular bus and isolation means operatively positioned in the circular bus between each pair of adjacent cores. The isolation means may comprise a plurality of transmission gate switches or a plurality of multiplexers.

The arbiter means may be operatively connected to each of the plurality of cores and receive access requests from the cores. The arbiter means may dynamically segment the circular segmented bus responsive to the access request. The arbiter means may dynamically segment the circular segmented bus responsive to the access request and destinations for data and to provide a maximum number of simultaneous transmissions.

Further features and advantages of the invention will be readily apparent from the specification and from the drawing.

DETAILED DESCRIPTION OF THE INVENTION

In accordance with the invention, a reconfigurable circular segmented bus is provided which enables more than one pair of cores to share the bus at the same time. The ability to support simultaneous data operations increases the bus available to the cores.

Figure 1:
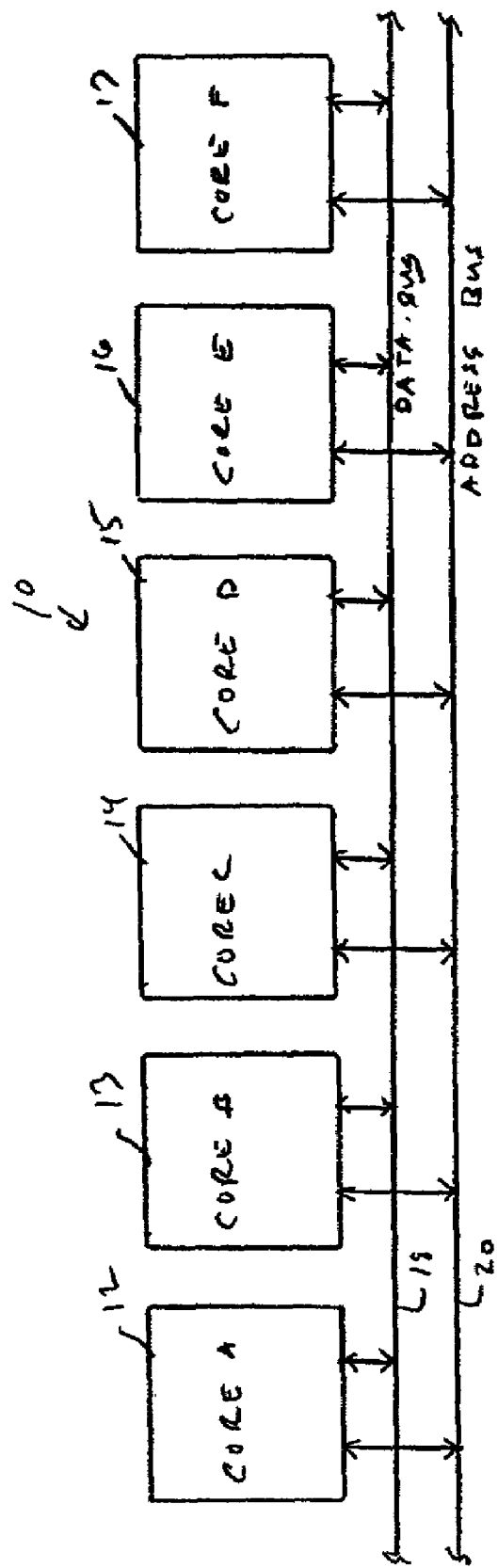
FIG. 1 is a block diagram of a prior art system for providing communication between cores in an integrated circuit.
Figure 2:
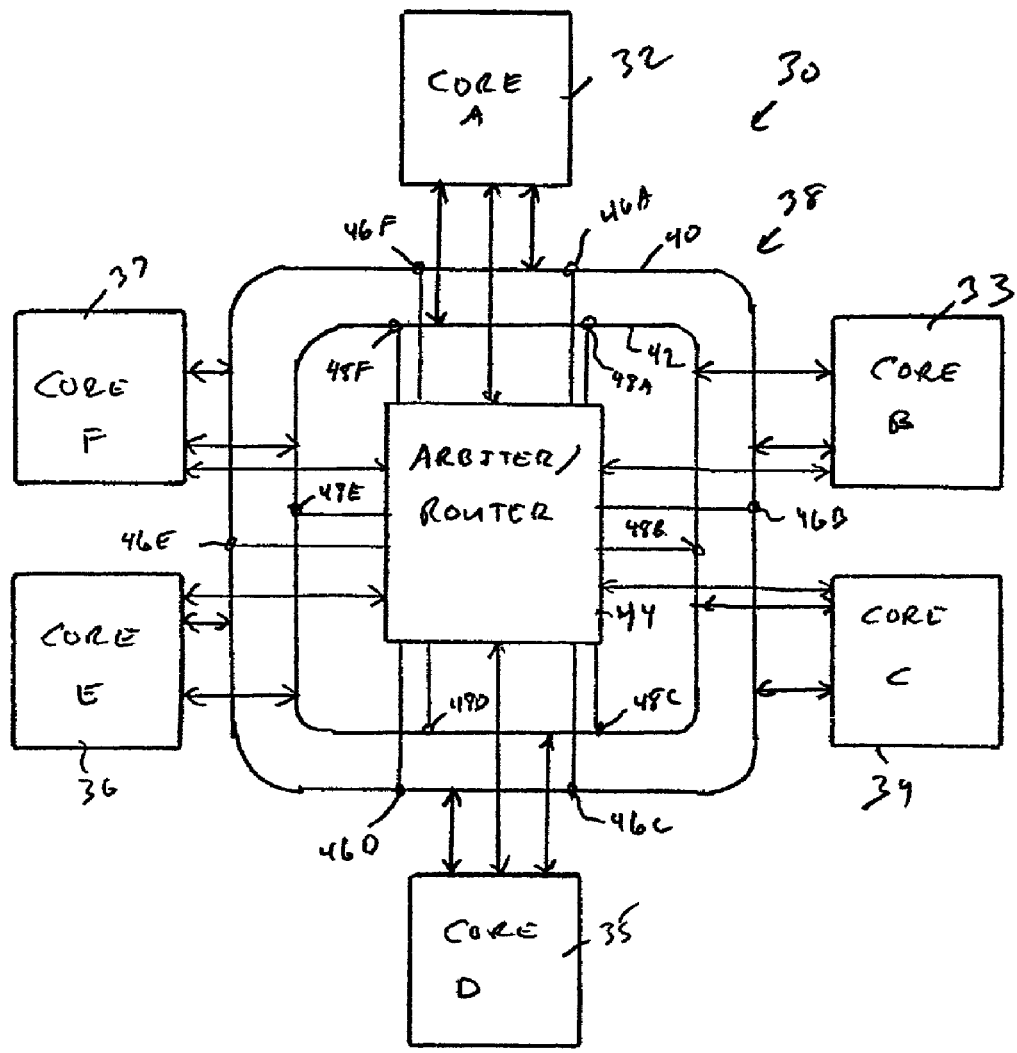
FIG. 2 is a block diagram of a system for providing communication between cores in an integrated circuit in accordance with the invention.

Referring to FIG. 2, a block diagram illustrates the interconnections of the reconfigurable circular segmented bus in accordance with the invention. Particularly, an integrated circuit 30 includes six core circuits, or cores, 32, 33, 34, 35, 36 and 37. The cores 32, 33, 34, 35, 36 and 37 are additionally identified with the letters A, B, C, D, E, and F, respectively. The present invention is not intended to be limited to any particular type of core circuits. The cores 32–37 may be configured as bus master devices that initiate an operation. Such core devices may include, for example, a processor, a peripheral device, a DMA controller, or the like. Additionally, some of the cores 32–37 may consist of bus slave devices which respond to operations.

The cores 32–37 are interconnected via a circular segmented bus system 38 in accordance with the invention. The bus system 38 includes a circular segmented data bus 40 and a circular segmented address bus 42. As is apparent, each of the buses 40 and 42 is functionally circular in configuration as it defines a continuous loop. The use of circular buses 40 and 42 allows data to be transferred on either bus 40 or 42 in two different directions.

An arbiter/router 44, referred to hereinafter as an arbiter, is connected to each of the cores 32–37. Additionally, the arbiter 44 is connected to a plurality of data bus isolation circuits 46A, 46B, 46C, 46D, 46E and 46F. Similarly, the arbiter 44 is connected to a plurality of address bus isolation circuits 48A, 48B, 48C, 48D, 48E and 48F. For simplicity, when referenced generally, the isolation circuits are identified using the reference numerals without the suffix letter. Each of the data isolation circuits 46 and address bus isolation circuits 48 is functionally located in the respective buses 40 and 42 between an adjacent pair of cores 32–37. As such, the isolation circuits 46 and 48 segment the respective buses 40 and 42 to reconfigure the bus system 38 by selectively isolating select cores 32–37 from other select cores 32–37, as described more particularly below.

Particularly, the isolation circuits 46A and 48A are functionally located in the respective data bus 40 and address bus 42 between core A and core B. The isolation circuits 46B and 48B are functionally located in the respective data bus 40 and address bus 42 between core B and core C. The isolation circuits 46C and 48C are functionally located in the respective data bus 40 and address bus 42 between core C and core D. The isolation circuits 46D and 48D are functionally located in the respective data bus 40 and address bus 42 between core D and core E. The isolation circuits 46E and 48E are functionally located in the respective data bus 40 and bus 42 between core E and core F. The isolation circuits 46F and 48F are functionally located in the respective data bus 40 and address bus 42 between core F and core A.

The isolation circuits 46 and 48 are generally conventional in nature. The isolation circuits 46 and 48 may consist of electrical switches in the bus, such as transmission gates. Alternatively, the function of the isolation circuits 46 and 48 may be performed logically using a multiplexer based loop which provides a logical implementation of a transmission gate. As is apparent, other types of isolation circuits may also be utilized in accordance with the invention.

In a system-on-a-chip (SOC) ASIC design, the address ranges of the cores connected to the bus is predetermined and is not altered during operation. The arbiter 44 is configured or programmed with this information and the cores 32–37 request access to the bus system 38 indicating the destination of the transfer. When multiple cores request bus access, the arbiter 44 determines which bus configurations will support which bus transfers and grant access to all of the cores that can operate simultaneously.

Figure 3:
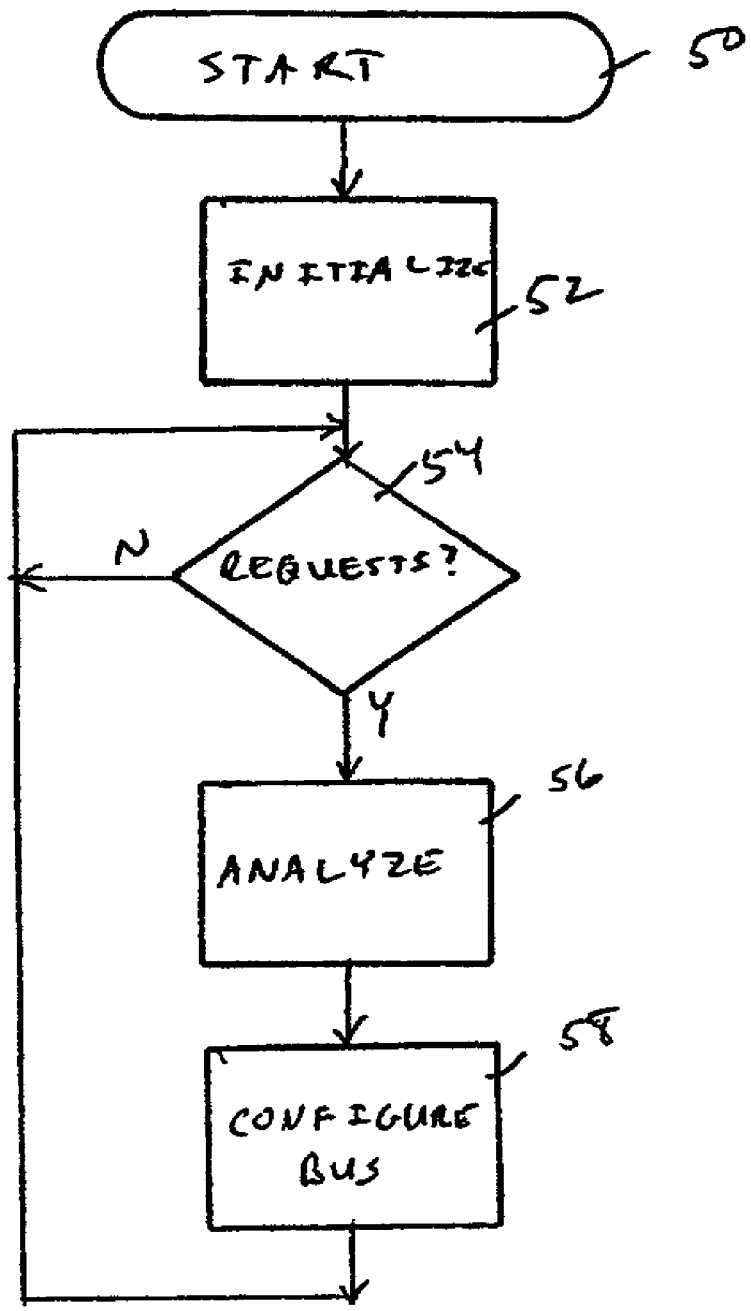
FIG. 3 is a flow diagram illustrating a program implemented by an arbiter/router of FIG. 2.

Referring to FIG. 3, a flow diagram illustrates operation of the arbiter 44 for determining the bus configuration. The program begins at a start node 50. A block 52 initializes the arbiter with the address range information and other necessary information. A decision block 54 determines if access requests have been received from any of the cores 32–37. If not, then the program loops back continuously until a request is received. Once an access request is received, then the arbiter 44 analyzes the access request at a block 56. The analysis includes considering what other cores have requested access, or currently have access, to the bus system 38. The object of the analysis is to maximize the number of operations that can be performed simultaneously. Likewise, the analysis may include different priority levels for different types of operations. As a result of the analysis, the bus system 38 is reconfigured at a block 58. Reconfiguring the bus system 38 comprises granting access to select ones of the cores 32–37 as determined by the analysis. The operations can then be performed. The control then returns to the decision block 54 to await additional requests.

Figure 4:
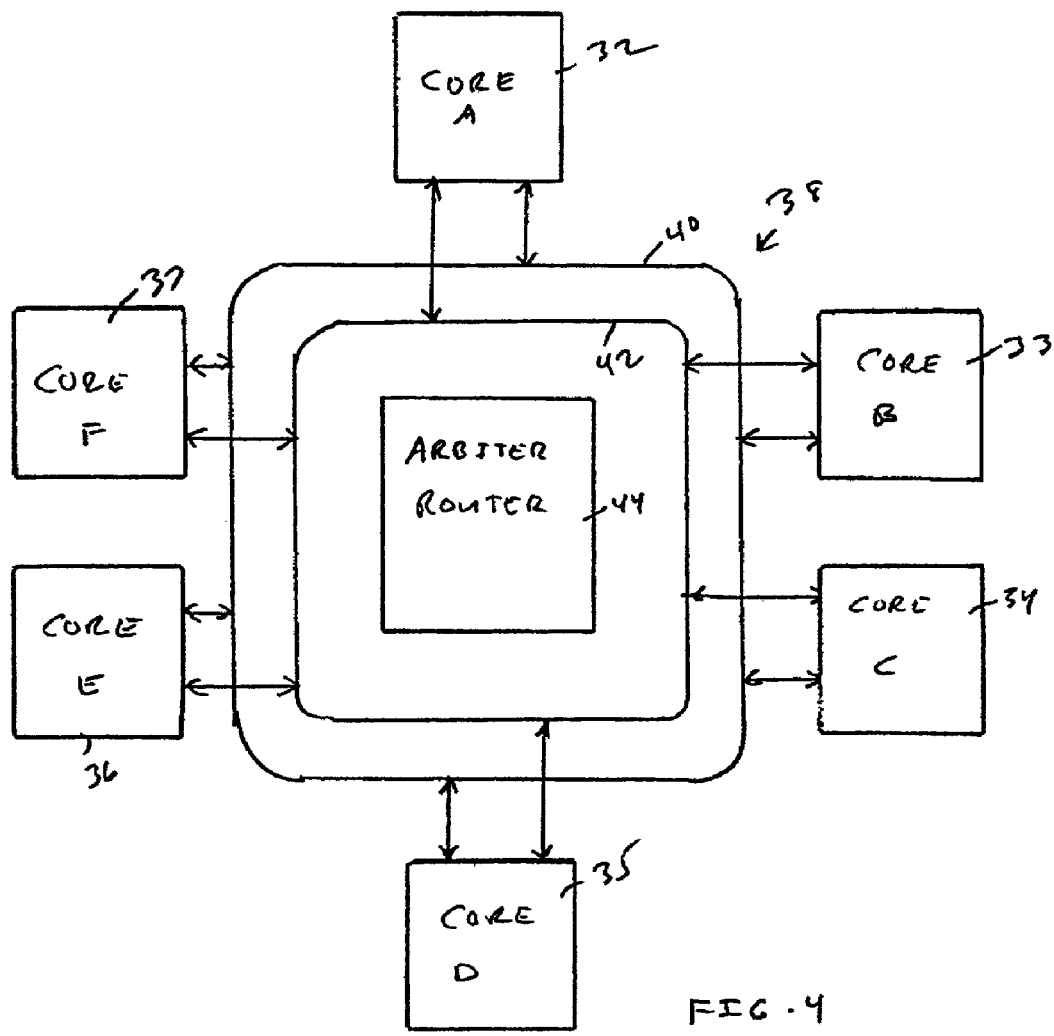
FIG. 4 is a block diagram, similar to FIG. 2, illustrating a configured circular bus capable of two simultaneous transfer operations.

One example of a reconfigured circular bus for multiple transfers is illustrated in FIG. 4. In this figure the isolation switches 46 and 48 and interconnections to the arbiter 44 are omitted for clarity. In this example, core A and core F have requested access to the bus system 38. The operation requested by core A involves core B. The operation requested by core F involves core D. Since these two operations do not need to share the same bus segments, both accesses are granted simultaneously. The bus is reconfigured to isolate the segment joining core A and core B. Likewise, the bus segment between core F and core D is isolated. The transfers occur and the utilized bus segments are made available to other operations upon the completion of the related operation.

Particularly, the segment of the bus system 38 joining core A and B is isolated by opening the data bus isolation switches 46F and 46B and opening the address bus isolation circuits 48F and 48B. Likewise, the bus segments between core F and core D are isolated by opening the data bus isolation circuits 46F and 46C and opening the address bus isolation circuits 48F and 48C. After the operation occurs, the utilized bus segments are made available to other operations.

Figure 5:
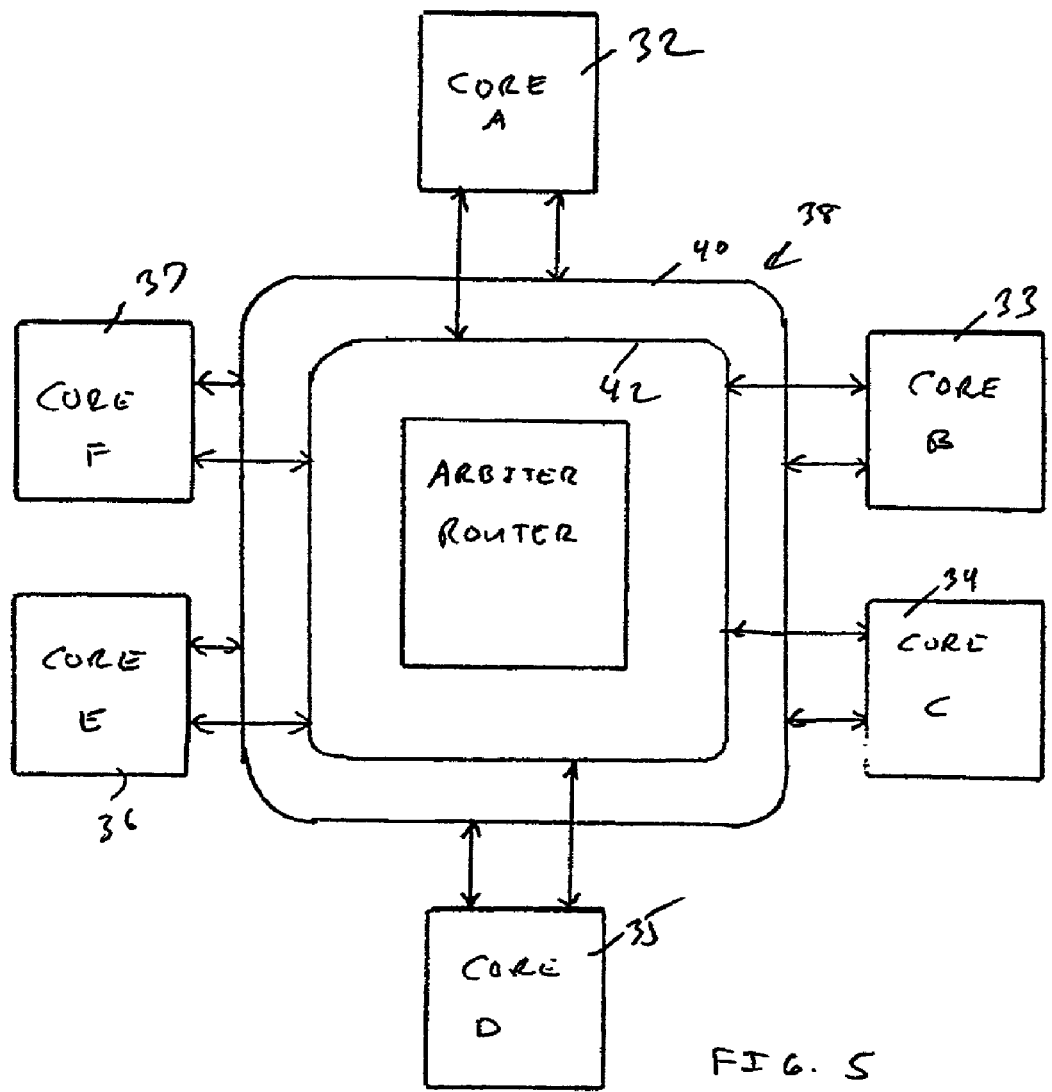
FIG. 5 is a block diagram, similar to FIG. 2, illustrating a configured circular bus capable of three simultaneous transfer operations.

Since operations may not be initiated at the same time, or may be of different durations, the router 44 can reconfigure the bus at any time. For instance, in the above example, the operation between core F and core D may complete before the operation between core A and core B. If another operation is requested by core F, this time involving core E, and core C requests access to perform a transfer operation with core D, because the necessary bus segments are available to support both operations, the bus can be reconfigured and the arbiter 44 grants access to both additional requesting cores. FIG. 5 illustrates the new configured circular bus configuration which is thus capable of three simultaneous operations. Particularly, the bus system 38 is reconfigured to isolate the segment joining core A and core B, and to isolate the segment joining core C and core D and finally, to isolate the segment joining core E and core F. This is done by opening the isolation circuits 46B and 48B, 46D and 48D and 46F and 48F, see FIG. 2.

As is apparent, the specific design of the arbiter 44 is unique to each ASIC. Once the concept of a particular ASIC is known, then the implementation of the arbiter 44 will be developed from such concept.

In one embodiment of the present invention, the bus system 38 would consist of a split transaction address and data bus and thus address and data are not linked as an operation. All bus masters maintain connections to the address bus 42 and the arbiter 44. A bus master would request access to the address bus 42 via a request to the arbiter 44 containing the more significant address bits. The number of bits is dependent upon the implementation and address ranges assigned to each bus slave. To minimize complexity, address ranges should be assigned on even powers of two across the various bus slaves. The arbiter 44 analyzes the requests from the various bus master cores to determine the best segmenting to serve the outstanding requests. The bus segmenting is redistributed upon the completion of each operation, which is indicated by the dropping of the request. When a bus segment has been created to serve a bus master core, then the bus master is granted the bus by the arbiter 44. The bus master maintains the request for the duration of the address operation and drops the request upon completion of the address transfer. The address bus consists of controls, address and transaction tag with master identification.

Additionally, in this embodiment, all bus masters and bus slaves maintain connections to the data bus and the arbiter 44. The request and granted handshake works in a similar manner as that of the address bus, discussed above, except the data bus request contains an I.D. of the bus master obtained during the address operation. The arbiter 44 uses this information to determine the appropriate bus segmenting to service the outstanding request. The bus slave maintains the request for the duration of the data operation and drops the request upon completion of the data transfer. The data bus consists of controls, data and transaction tag with master identification.

Thus, in accordance with the invention, there is illustrated a system for providing communication between cores in an integrated circuit using a circular segmented bus for transferring data.

What is claimed is:

1. A system for providing communication between a plurality of cores in an integrated circuit, the system comprising:
 a circular segmented bus operatively connected to each of the cores for transferring data between the plurality of cores; and
 arbiter means for arbitrating which of the plurality of cores can transmit data at any given time, the arbiter means dynamically segmenting the circular segmented bus to enable plural simultaneous data transmissions on the bus,
 wherein the arbiter means is operatively connected to ech of the plurality of cores and receives access requests from the cores.

2. The system of claim 1 wherein the circular segmented bus comprises a data bus.

3. The system of claim 1 wherein the circular segmented bus comprises an address bus.

4. The system of claim 1 wherein the arbiter means dynamically segments the circular segmented bus responsive to the access requests.

5. The system of claim 1 wherein the arbiter means dynamically segments the circular segmented bus responsive to the access requests and destinations for data and to provide a maximum number of simultaneous transmissions.

6. The system of claim 1 wherein the arbiter means dynamically segments the circular segmented bus responsive to the access requests and preselect priorities of the access requests.

7. A system for providing communication between a plurality of cores in an integrated circuit, the system comprising:
 a circular segmented bus operatively connected to each of the cores for transferring data between the plurality of cores, wherein the circular segmented bus comprises a circular bus and isolation means operatively positioned in the circular bus between each pair of adjacent cores; and
 arbiter means for arbitrating which of the plurality of cores can transmit data at any given time.

8. The system of claim 7 wherein the isolation means comprises a plurality of transmission gate switches.

9. The system of claim 7 wherein the isolation means comprises a plurality of multiplexers.

10. An integrated circuit having a reconfigurable bus comprising:
 a plurality of cores;
 a circular bus;
 means for operatively connecting the plurality of cores around the circular bus for transferring data on the circular bus between the plurality of cores;
 isolation means operatively positioned in the circular bus between each pair of adjacent cores; and
 an arbiter operatively connected to each of the plurality of cores and to the isolation means for arbitrating which of the plurality of cores can transmit data at any given time and reconfiguring the circular bus to isolate segments of the circular bus.

11. The system of claim 10 wherein the circular bus comprises a data bus.

12. The system of claim 10 wherein the circular bus comprises an address bus.

13. The system of claim 10 wherein the isolation means comprises a plurality of transmission gate switches.

14. The system of claim 10 wherein the isolation means comprises a plurality of multiplexers.

15. The system of claim 10 wherein the arbiter means receives access requests from the cores.

16. The system of claim 15 wherein the arbiter means dynamically segments the circular segmented bus responsive to the access requests.

17. The system of claim 15 wherein the arbiter means dynamically segments the circular segmented bus responsive to the access requests and destinations for data and to provide a maximum number of simultaneous transmissions.

18. The system of claim 15 wherein the arbiter means dynamically segments the circular segmented bus responsive to the access requests and preselect priorities of the access requests.

19. The system of claim 10 wherein the plurality of cores comprise bus master circuits and bus slave circuits.

20. The system of claim 19 wherein the circular bus comprises a split transaction data bus and address bus.

21. The system of claim 20 wherein one of the bus master circuits is operable to request access to the address bus using a request to the arbiter container more significant address bits in an address operation.

22. The system of claim 21 wherein a data bus request contains an identification of the one bus master circuit obtained during the address operation.

* * * * *